A. KOENIG.
LOCKING DEVICE FOR THE OPERATING LEVERS OF AUTOMOBILES.
APPLICATION FILED OCT. 25, 1917.
1,325,872.
Patented Dec. 23, 1919.
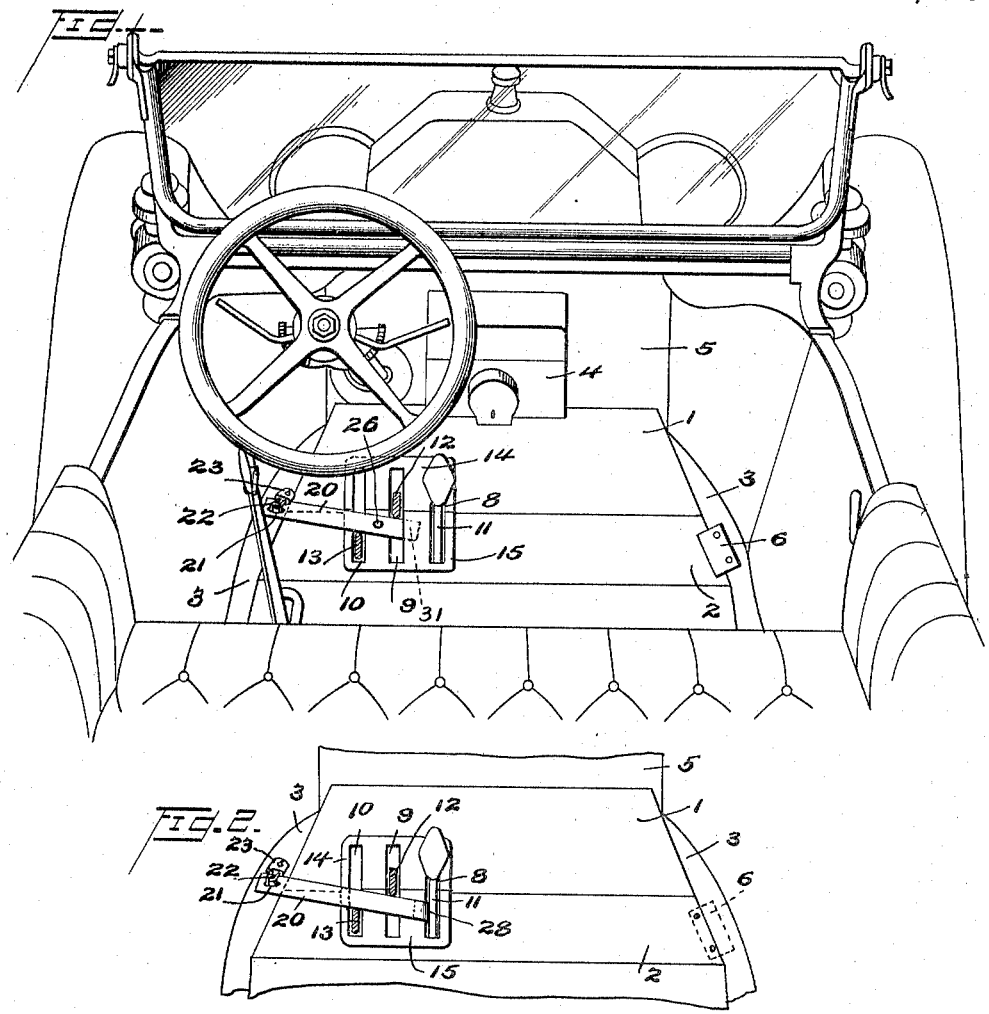

UNITED STATES PATENT OFFICE.

AUGUSTUS KOENIG, OF PHILADELPHIA, PENNSYLVANIA.

LOCKING DEVICE FOR THE OPERATING-LEVERS OF AUTOMOBILES.

1,325,872. Specification of Letters Patent. Patented Dec. 23, 1919.

Application filed October 25, 1917. Serial No. 198,391.

*To all whom it may concern:*

Be it known that I, AUGUSTUS KOENIG, a citizen of the United States, residing in Philadelphia, county of Philadelphia, State of Pennsylvania, have invented certain new and useful Improvements in Locking Devices for the Operating-Levers of Automobiles, of which the following is a specification.

My invention has for its object to provide a simple and inexpensive means for locking the operating levers of an automobile in positions to prevent their operation and thereby prevent the removal of the automobile or machine by anyone attempting or desiring to steal the same.

A further object of my invention is to provide a device which is adapted to be secured in such position with respect to the operating levers of an automobile or similar vehicle that they may be held against operation and thereby prevent the automobile or other vehicle from being readily removed from whatever position it may occupy and thereby prevent the stealing of the same.

Other objects and advantages of my invention will be specifically and particularly pointed out in the description thereof which follows or will be apparent from such description.

In order that my invention may be more readily understood and its practical and commercial advantages fully appreciated and comprehended reference may be had to the accompanying drawing in which I have illustrated several forms of convenient embodiments thereof. It will be understood, however, that changes in the details of construction may be made within the scope of the claim without departing from my invention.

In the drawing:—

Figure 1 is a view of the top portion of the front part of the body of an automobile looking forwardly and downwardly toward the front part of the same, the said view showing certain levers in transverse section and one form of locking device embodying my invention.

Fig. 2 is a top plan view of the front portion of the bottom part of an automobile body showing certain levers in transverse section and a modified form of locking device embodying my invention.

Although I have shown my invention as applied to a Ford automobile I desire it to be understood that it is not limited or restricted to any particular make of car; that is, to a car manufactured by any particular concern.

The principle of my invention is applicable to automobiles of various makes and constructions and its very simplicity renders it practically very desirable and efficient.

Referring to the drawing, 1 and 2 designate upwardly inclined boards which are situated at the front part of the bottom of an automobile body, such as that found in the bodies of Ford cars at present upon the market. These boards are supported at their opposite ends upon side frame portions 3. The upper edge of the board 2 is provided with a portion overlying or overlapping the lower edge portion of the board 1 so that by providing means for preventing the lifting of the board 2 from its normal position of rest upon the sills 3 the board 1 is secured and held in position by reason of the fact that its upper edge is situated underneath the coil box 4 fastened to the dash board 5. The right hand end of the board 2 is held in position by the retaining clip or plate 6 secured by rivets or equivalent means to the frame member 3 (as shown in Fig. 1) upon the right hand side of the body. Instead of securing the clip 6 to the frame member it may be secured to the under side of the board 2 and arranged to project into a slot formed in the inner side of said frame member 3, as indicated by dotted lines in Fig. 2. The other end of the board 2 is held in position by the locking device, as will hereinafter appear.

The boards 1 and 2 are provided with slots 8, 9 and 10 through which the brake, reverse gear, and high and low gear levers 11, 12 and 13 respectively project. The portions of the top surface of the boards 1 and 2 adjacent to and surrounding the slots 8, 9 and 10 are protected and strengthened by the presence of slotted covering or protecting plates 14 and 15 secured to said boards.

In both Figs. 1 and 2 the locking device for locking and holding the operating levers in certain positions to prevent operation thereof and to prevent the automobile from being readily carried away or moved away by anyone desiring to steal the same consists of or comprises a bar 20 provided at its outer end with a slot 21 through which the closed end 22 of a U-bolt projects or extends. The opposite sides of this U-bolt or U-shaped device extend through the sill 3 at the left hand side of the car body (which sill is nearest the operating levers 11, 12 and 13) and are non-removably secured to the said sill in any convenient manner. The slotted end of the locking device is secured in engagement with the said U-bolt by means of a lock 23.

In Fig. 1 of the drawing the inner end of the locking bar 20 is provided with a downwardly bent and inwardly extended portion 31 which is adapted to extend through the slot 9 and underneath the portion of the board 1 intermediate the slots 8 and 9. When in such position it is clear that the said bar cannot be removed without unlocking and removing the lock 23. The locking bar is situated intermediate the reverse gear lever 12 and the high and low gear lever 13, the latter being in high gear position and the former being in position with the reverse gears (not shown) in mesh.

It is apparent that with the levers 12 and 13 held by the locking bar 20 in the positions shown in Fig. 1, it is impossible for the car to be moved or driven in either direction, forward or back.

In Fig. 2 of the drawing the locking bar 20 is situated with respect to the levers 12 and 13 in the same position as shown in Fig. 1. It is, however, secured to the board 2 in a different manner, being provided with a downwardly extended hook 28 which is adapted to extend into and through the slot 8 and to engage the left hand edge of said slot and the underneath side of said board adjacent said edge. With the hook 28 in engagement with the board 2, as shown in Fig. 2, it is apparent that the locking bar 20 cannot be removed without first unlocking and removing the lock 23. By unlocking and removing the latter, however, the locking bar 20 may be completely removed to permit the operation of the operating levers 12 and 13 as desired in the normal way.

In both forms of construction the presence of the locking bar 20 prevents the lifting or raising of the left hand end portion of the board 2 which is situated under the said board. It is apparent, therefore, that by reason of the presence of the holding or fastening clip 6 and the locking bar 20 the board 2 (and consequently the board 1) is held securely in place.

By the term "board" employed herein to describe the parts 1 and 2 I intend to include and comprehend metallic plates or plates of other material which would be the equivalent of wooden boards.

I claim:—

In combination, the bottom of an automobile body, said body having slots extending therethrough, operating levers extending through the said slots, a locking bar having connection with a relatively fixed part of the body of the automobile and extending inwardly and transversely of the body of said car in locking relation to said levers and the said bar being provided with a part at its inner end which extends through one of the said slots and engages the bottom of said body, whereby the said inner end is held in locking relation to the levers.

In testimony that I claim the foregoing as my invention, I have hereunto signed my name this 23 day of October, A. D. 1917.

AUGUSTUS KOENIG.